United States Patent
Mitchell et al.

[15] 3,646,514
[45] Feb. 29, 1972

[54] VEHICLE LOW TIRE PRESSURE SIGNAL SYSTEM

[72] Inventors: Phillip G. Mitchell, 305 Highland Avenue, Opelika, Ala. 36801; Fredrick S. Hagans, 8 South Church Street, Sylacauga, Ala. 35150; James Noel Baker, 445 Opelika Road, Auburn, Ala. 36830; Glenn R. McClendon, Opelika Highway, Drawer H, Lafayette, Ala. 36862

[22] Filed: Apr. 24, 1970

[21] Appl. No.: 31,514

[52] U.S. Cl. ............................................340/58, 200/61.25
[51] Int. Cl. ......................................................360c 23/02
[58] Field of Search ...........340/58; 200/61.22, 61.23, 61.25, 200/61.26

[56] References Cited

UNITED STATES PATENTS

| | | | |
|---|---|---|---|
| 2,710,391 | 6/1955 | Trinca | 340/58 |
| 3,508,193 | 4/1970 | Giovannelli et al. | 340/58 |
| 2,199,032 | 4/1940 | Stoddard | 200/61.26 |
| 3,271,736 | 9/1966 | Brown et al. | 340/52 F |

*Primary Examiner*—Alvin H. Waring
*Attorney*—Newton, Hopkins & Ormsby

[57] ABSTRACT

A low-pressure alarm system for pneumatic tires including a sensing unit operatively connected to each tire pressure, a detection unit carried by each stationary tire hub for detecting when the sensing unit is activated and a light panel connected to the detecting unit through a solid-state control circuit to indicate which tire assembly has a low pressure. The detection units are manually set to a detecting position and, once tripped by the associated sensing unit, remains tripped until manually reset.

4 Claims, 6 Drawing Figures

INVENTORS
PHILLIP P. MITCHELL
FREDRICK S. HAGAN
JAMES N. BAKER
GLENN R. McCLENDON
BY: Newton, Hopkins, & Ormsby
ATTORNEYS

VEHICLE LOW TIRE PRESSURE SIGNAL SYSTEM

BACKGROUND OF THE INVENTION

Pneumatic tires on present day vehicles frequently become punctured or deflated for various reasons resulting many times in serious injury. This is especially true in heavy trucks since, when one tire of a set carried by a single wheel loses pressure, there is no warning and the extra load transferred to the remaining tire causes same to sometimes heat up and blow out.

While certain attempts have been made to provide a visual warning system for low pressures in the tires of a vehicle, such devices have generally been expensive to construct, install and maintain. Moreover such devices were complicated in construction and were subject to malfunction without visually indicating such malfunction.

SUMMARY OF THE INVENTION

These and other problems associated with prior art low-pressure alarm systems are overcome by the invention disclosed herein in that it is simple in construction and can be easily installed on existing equipment without altering same. Further, means is provided for indicating a malfunction within the alarm system itself and the light indicating which wheel assembly has a tire with low pressure pulsates when illuminated.

Accordingly, it is one of the objects of the invention to provide a low pressure alarm system which provides a visual indication of low pressure in a particular set of tires carried on a wheel assembly.

Another object of the invention is to provide a low-pressure alarm system having means for visually indicating a malfunction within the alarm system itself.

A still further object of the invention is to provide a low-pressure alarm system which can be installed without modification of existing vehicle structures.

An additional object of the invention is to provide a low-pressure alarm system simple in construction and easily maintained.

Another object of the invention is to provide a low-pressure alarm system which provides not only a visual indication of the set of tires having a low pressure therein but also a visual indication of which tire of the set which has a low pressure.

A still further object of the invention is to provide a low-pressure alarm system which has certain built in safety features to prevent malfunction of said system.

Another object of the invention is to provide a low-pressure alarm system which does not alter the dynamic balance of the set of tires and wheel assembly when installed.

The apparatus of the invention includes a sensing unit associated with each tire of a set and mounted for rotation with the set of tires, and a detection unit carried by each nonrotating hub portion of each wheel assembly. Each detection assembly is associated with an appropriate indicator light through a solid state control circuit to indicate visually in the cab of the vehicle which set of tires has a low-pressure tire. The sensing unit that is activated provides a visual indication of which tire of the set is deflated when the vehicle stops.

Each detection unit is manually set for sensing when a tire is deflated and, upon activation, remains activated until manually reset to provide a continuous signal. The control circuit includes a flasher section to cause the illuminated bulbs to flash to draw the driver's attention thereto. Also included, in the control circuit is a malfunction detector section which senses if an indicator bulb is burned out and a signal is sent thereto to illuminate same.

These and other features, objects and advantages of the invention disclosed herein will become more apparent on consideration of the following specification and accompanying drawings wherein like characters of reference designate corresponding parts throughout and in which:

These figures and the following detailed description of the invention disclose specific embodiments thereof, however, it is to be understood that the inventive concept is not limited thereto since it may be embodied in other forms.

DETAILED DESCRIPTION OF ILLUSTRATIVE EMBODIMENTS

Figure 1:
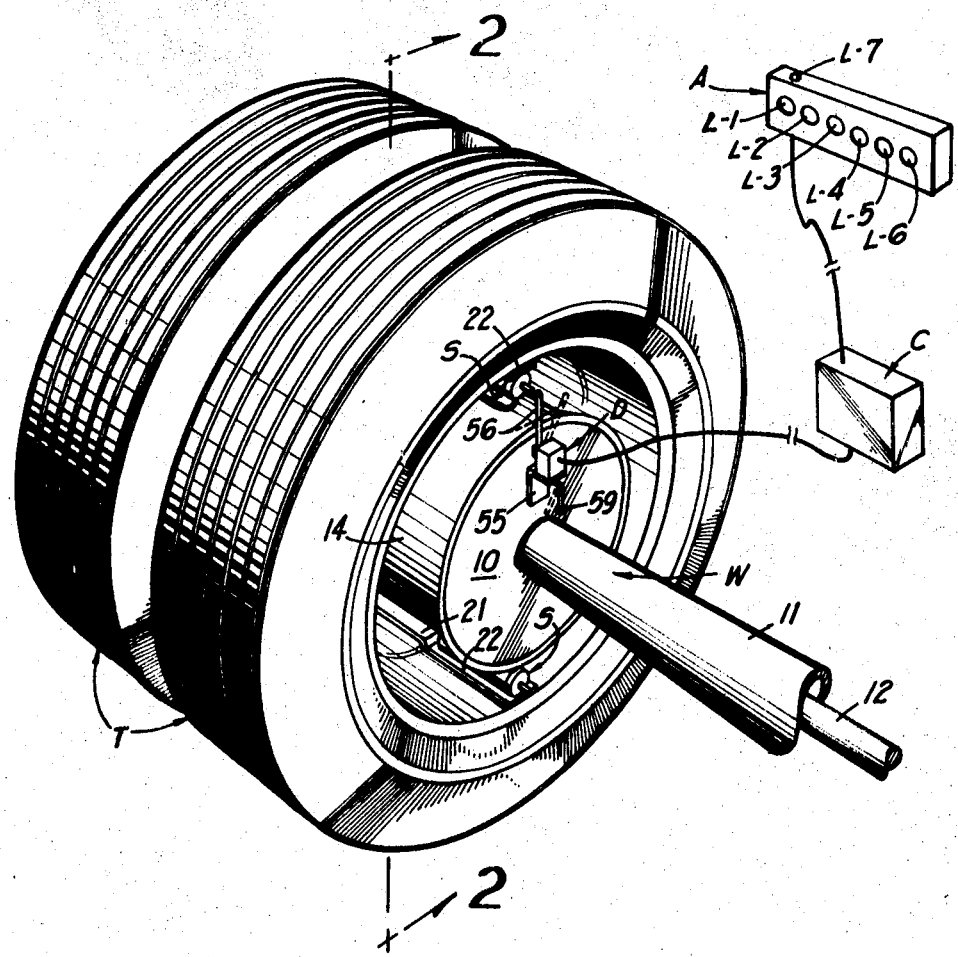
FIG. 1 is a partial perspective view of a wheel and tire assembly showing the one embodiment of the invention installed thereon.

Referring to the drawings, and more particularly to FIG. 1, it will be seen that the invention includes a sensing unit S associated with each tire T of a vehicle, a detection unit D associated with each wheel assembly W of the vehicle, a control circuit C appropriately carried by the vehicle and operatively connected to each detection unit D, and an indicator or annunciator panel A usually carried in the driver's cab of the vehicle and operatively connected to the control circuit C. The sensing unit S is mounted on the rotating rims of the assembly W and the detection unit is carried by the fixed hub of the assembly W so that the unit S will pass in the vicinity of the unit D once per revolution of the tires T.

Figure 2:
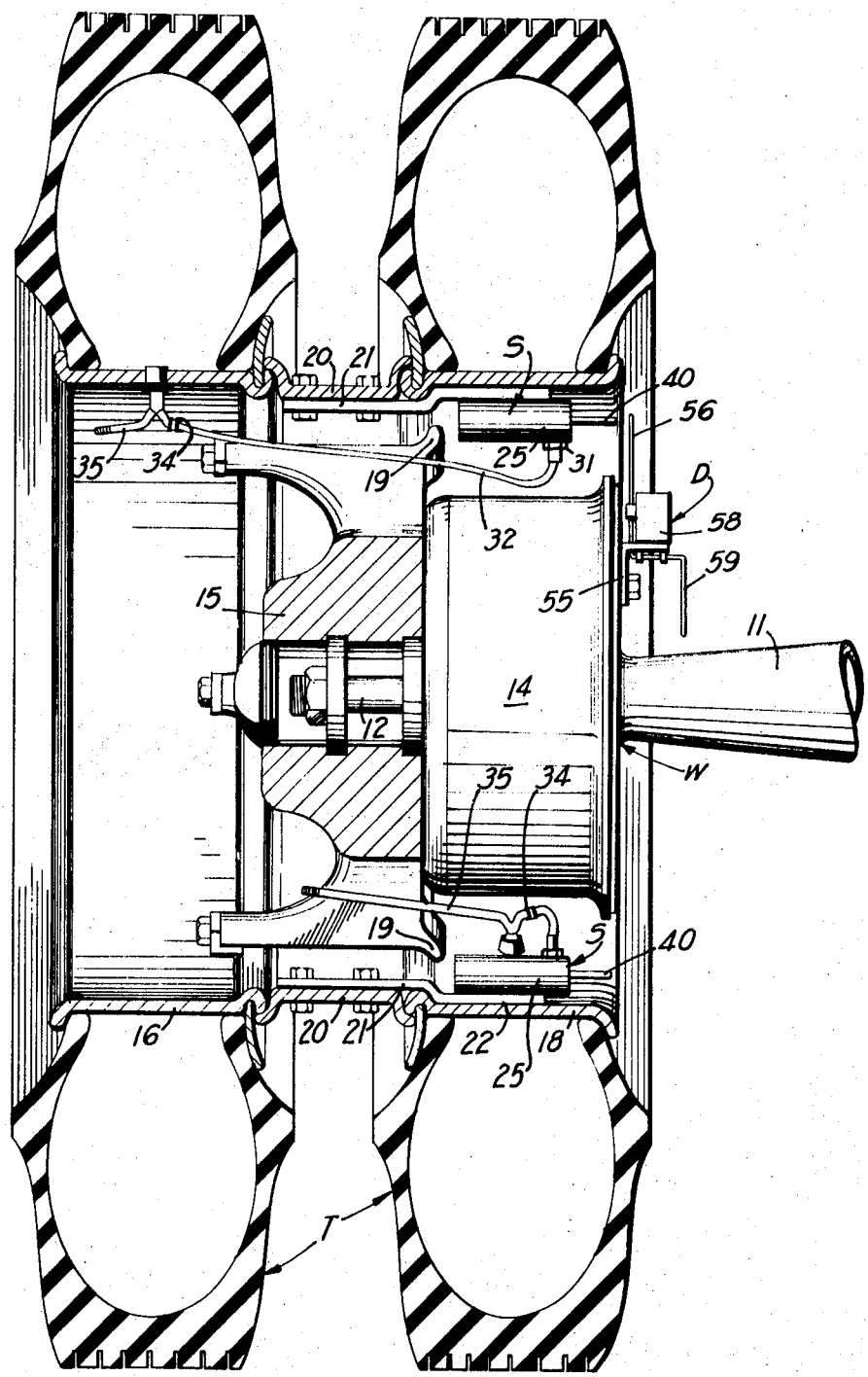
FIG. 2 is a cross-sectional view taken substantially along line 2—2 in FIG. 1.

Referring to FIG. 2, the wheel assembly W carries a dual set of tires T and includes a fixed hub 10 carried by axle housing 11. The axle 12 rotatably extends therethrough to mount a brake drum 14 and driving spider 15 thereon for rotation therewith. An outside rim 16 is bolted to spider 15 and an inside rim 18 engages the positioning lugs 19 on spider 15. An annular spacer 20 extends between rims 16 and 18 to maintain them in a spaced apart relationship when clamped within spider 15 in conventional manner.

A pair of mounting brackets 21 are bolted to diametrically opposite sides of spacer 20 and are appropriately formed to extend toward the inner rim 18. A mounting leg 22 is provided on each which lies in juxtaposition with the inside of rim 18.

Figure 3:
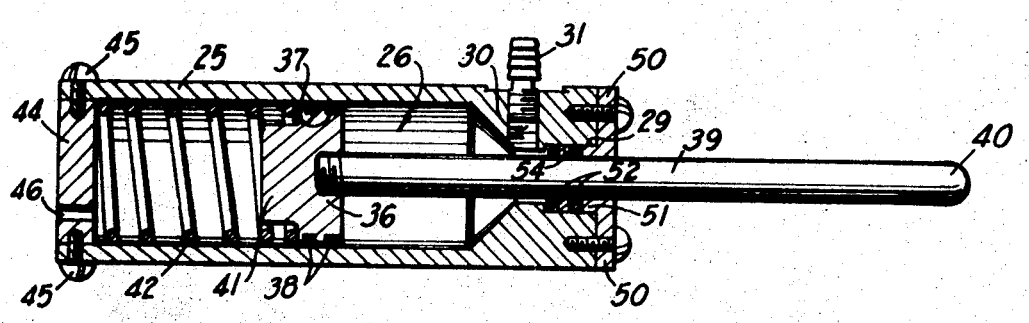
FIG. 3 is a longitudinal cross-sectional view of one embodiment of the sensing unit of the invention.

Each mounting leg 22 carries a sensing unit S thereon. The sensing unit S includes a cylindrical housing 25 as best seen in FIG. 3 defining a cavity 26 therein opening onto one end of housing 25. A reduced diameter piston passage 29 extends from the terminal end of cavity 26 to the opposite end of housing 25 and an annular recess 29 around the exit end of passage 28 is also defined in housing 25. A threaded pressure inlet port 30 extends radially outward from the juncture of cavity 26 and passage 28 to permit cavity 26 to be in communication with the air pressure in tire T through fitting 31 threadedly received in port 30. Fitting 31 communicates with tire T through hose 32 and connector 34 on valve stem 35 of tire T as seen in FIG. 2.

Referring back to FIG. 3, a sensor piston 36 is slidably received in cavity 26 in sealing engagement therewith. Piston 36 defines a pair of spaced annular grooves 37 therearound to receive a pair of resilient O-rings 38 therein. The O-rings 38 provide the sliding sealing engagement between the piston 36 and housing 25. An indicator piston rod 39 is threadedly received in that side of piston 36 facing passage 28 and protrudes through passage 28. Rod 39 is appropriately dimensioned for the trip end 40 thereof to be retracted toward the right end of housing 25 when piston 36 is bottomed to the left as seen in FIG. 3.

A positioning boss 41 extends from that side of piston 36 opposite rod 39 and a compression coil spring 42 is received therearound and within cavity 26. A closure plate 44 is received in the open end of cavity 26 behind spring 42 and is attached to housing 26 by fasteners 45. The plate 44 prevents ejection of spring 42 as piston 36 is moved to the left in FIG. 3 to compress same and a vent 46 is defined therethrough to prevent an air lock between piston 36 and plate 44. The length and compressive strength of spring 42 is such that the air pressure from tire T through port 30 will fully retract rod 39 and piston 36 if the pressure is within the proper range specified by the manufacturer. If the air pressure drops however, the spring 42 will cause rod 39 and piston 36 to extend to expose the trip end 40 thereof and trip the detection unit D associated therewith.

Rod 39 is maintained centered in passage 28 by a bushing 50 attached to that end of housing 25 onto which recess 29 opens. Bushing 50 includes an annular detent 51 which extends into recess 29 to position a pair of sealing O-rings 52 in recess 29 with an annular spacer 54 between O-rings 52. The detent 51 is dimensioned to force O-rings 54 into sealing engagement with recess 29 and rod 39 to seal the pressure chamber portion 55 of cavity 26 in combination with the O-rings 38 around piston 36.

Only one of the sensing units S is described in detail since the construction is the same for each and like numbers will be applied to each.

The detection unit D as best seen in FIGS. 1 and 2 is mounted on fixed hub 10 by an inverted L-shaped mount 55 bolted thereto. The unit D is positioned on mount 55 so that its activating wand 56, when set for activation, extends to a position in the vicinity of the inside edge of inner rim 18 and into the path of the trip ends 40 of the rods 38 when the air pressure in tires T is sufficiently low to allow spring 42 to extend same.

The wand 56 is rotatably carried by casing 58 and is mechanically connected to a toggle switch mechanism (not shown) having contacts S-1 (see FIG. 4) which are open when wand 56 is in its detecting position set for activation (see solid line position in FIG. 1) and closed when wand 56 is in its deflected activated position (see dashed line position in FIG. 1). The toggle switch mechanism is such that wand 56 will remain in its detecting or activated positions until forcibly moved to the other position. Therefore, once wand 56 is set in its detecting position, it will remain there until tripped by rod 39 striking same to its activated position. Once tripped, wand 56 will remain in its activated position with contacts S-1 closed until reset manually through reset lever 59.

Figure 4:
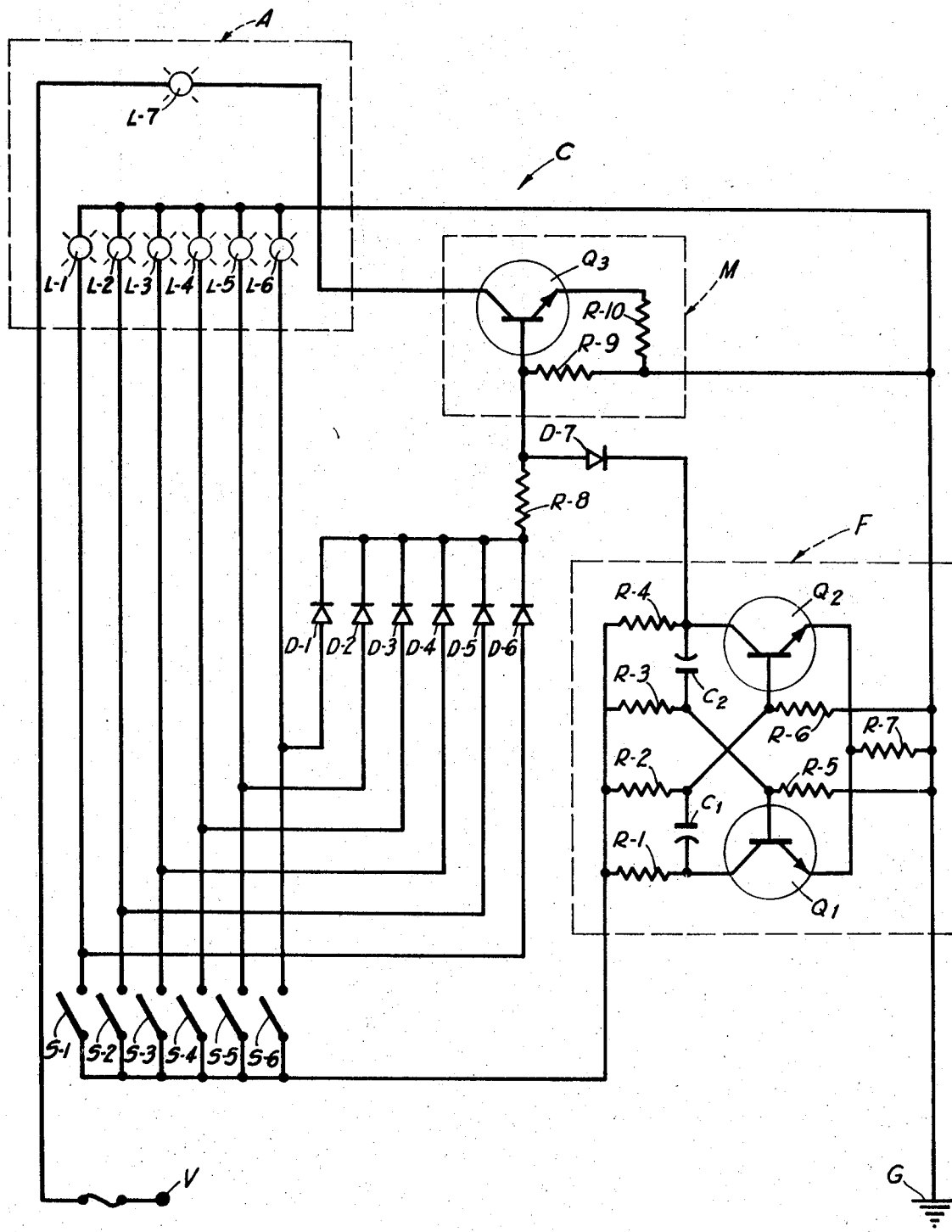
FIG. 4 is an electrical schematic diagram of one embodiment of the control circuit of the invention.

Referring to FIG. 4, the control circuit C includes a plurality of switch contact S-1 through S-6 connected in parallel through indicator bulbs L-1 through L-8 respectively from voltage source V to common ground G. Contacts S-1 through S-6 correspond to each wheel assembly of the vehicle and are the switch contacts of the detection units D. Bulbs L-1 through L-6 are carried by annunciator panel A and represent each individual wheel assembly respectively. Appropriate indicia may be provided on panel A to identify the wheel assembly associated with the corresponding light bulb.

Bulbs L-1 through L-6 are neon lamps having a certain threshold activating voltage. The bulbs L-1 through L-6 are connected in parallel to a pulsating voltage source from flasher section F of circuit C through diodes D-1 through D-6 respectively, resistor R-8 and diode D-7. Flasher section F includes transistors $Q_1$ and $Q_2$ appropriately connected to voltage source V through resistors and capacitors to give a square wave pulsating voltage output. The voltage supplied to bulbs L-1 through L-8 is insufficient in itself to exceed the threshold voltage thereof, but, once any one of contacts S-1 through S-6 is closed, its associated bulb will illuminate since its threshold voltage is exceeded upon closure of the switch. The voltage from section F now serves to pulsate the bulb to flash same.

The voltage output from section F is also connected to ground G through a malfunction detection section M. Section M is connected to source S through malfunction indicator bulb L-7. Section M includes a transistor $Q_3$ appropriately connected to section F and bulb L-7 so that transistor $Q_3$ will conduct if one of bulbs L-1 through L-7 is blown to open that portion of the circuit. This causes bulb L-1 to be illuminated if any bulbs L-1 through L-6 malfunction.

The transistors $Q_1$, $Q_2$ and $Q_3$ are NPN transistors designated 2N3643. The values of the resistors and capacitors of circuit C are set forth in Table I.

TABLE I

| Component Reference | Rating |
| --- | --- |
| $R_1$ | 1.8K ohm |
| $R_2$ | 22 K ohm |
| $R_3$ | 22 K ohm |
| $R_4$ | 1.8K ohm |
| $R_5$ | 6.8K ohm |
| $R_6$ | 6.8K ohm |
| $R_7$ | 270 ohm |
| $R_8$ | 1.2K ohm |
| $R_9$ | 6.8K ohm |
| $R_{10}$ | 100 ohm |
| $C_1$ | 15 mfd. |
| $C_2$ | 15 mfd. |

Figure 5:
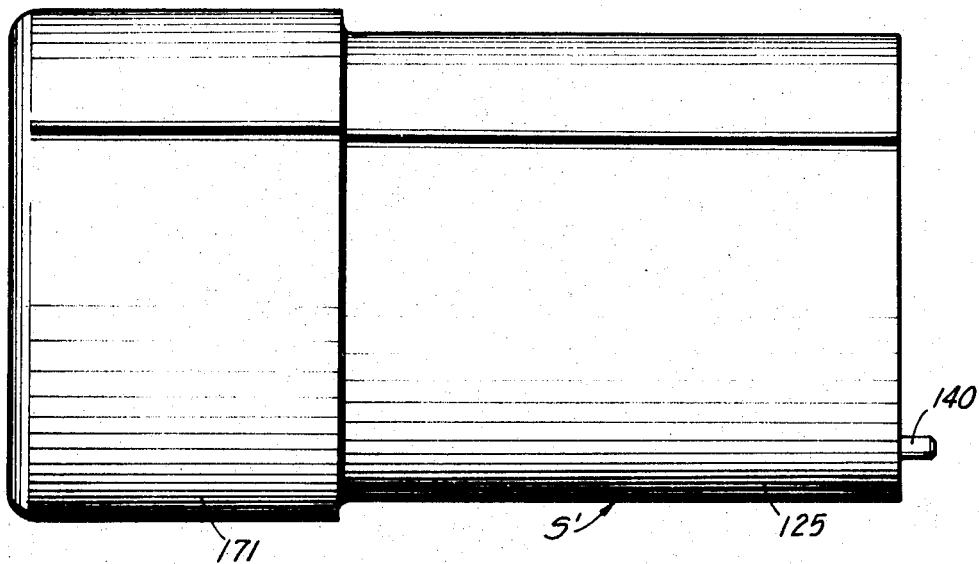
FIG. 5 is a side elevational view of a second embodiment of the sensing unit of the invention; and, FIG. 6 is a longitudinal cross-sectional view of the sensing unit of FIG. 5.
Figure 6:
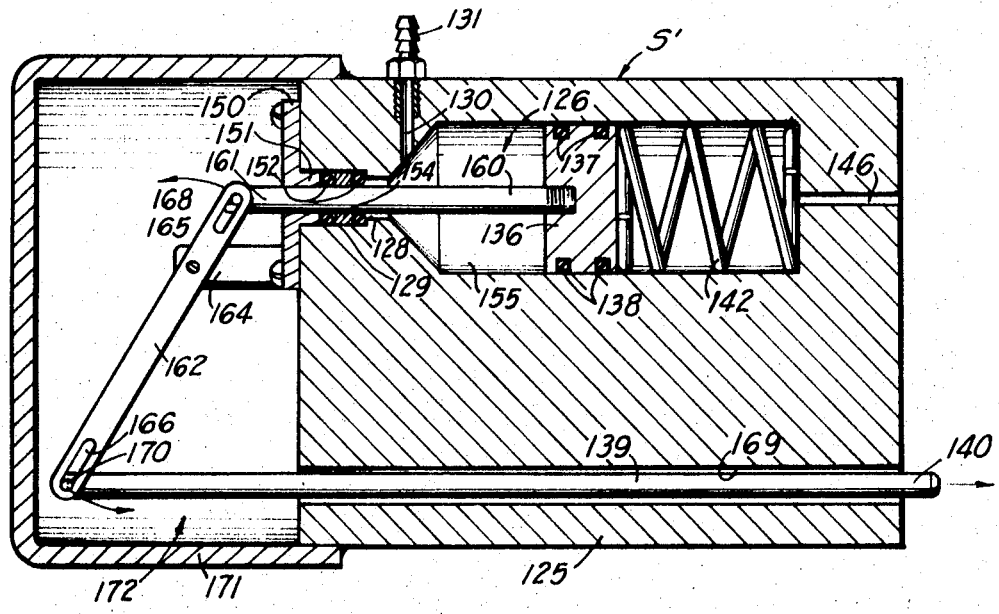

Referring to FIGS. 5 and 6, it will be seen that a second embodiment of the sensing unit is shown and designated S'. The units S' can be used in lieu of units S and are adapted to trip the wands 56 of detection units D in the same manner as the units S. The unit S' will extend its indicator rod 139 further than unit S for the same amount of travel of its piston 136 as compared with that of piston 36 in unit S.

The unit S' includes a housing 125 much larger in diameter than housing 25. Housing 125 defines a cavity 126 therein offset from the centerline of housing 125 and having a diameter substantially equal in dimensions to that of cavity 26. A passage 128 similar to rod passage 28 extends from one end of cavity 126 through housing 125 in alignment with the centerline of cavity 126. A vent 146 extends from the opposite end of cavity 126 to vent same to the atmosphere. The recess 129 is defined about the exit end of passage 128.

A piston 136 is slidably received in cavity 126 in sealing engagement therewith through O-rings 138 carried in grooves 137 around piston 136. A spring 142 similar to spring 42 is carried in cavity 126 between piston 136 and the vent end of cavity 126 to force piston 136 to the left toward passage 128 as seen in FIG. 5. A piston rod 160 is threaded into piston 136 to slidably extend through passage 128 and a bushing 150 through detent 151, O-rings 152 and spacer 154 in recess 129 maintain rod 160 centered in passage 128. The O-rings 152 seal passage 128 to define a pressure chamber 155 in communication with the air pressure in tires T through fitting 131 in port 130 similar to the unit S.

The driving end 161 of rod 160 is pivotally connected to a drive link 162. Drive link 162 is rotatably pinned to outstanding bracket 164, and defines a driven slot 165 in one end thereof and a driving slot 166 in the opposite end thereof. Driven slot 165 is connected to the driving end 161 of rod 160 through pin 168 so that as rod 160 is extended or retracted, link 162 will be drivingly pivoted.

Driving slot 166 is connected to the inner end of indicator rod 139 which is slidably received through a passage 169 in housing 125 diametrically opposite cavity 126 by pin 170. Therefore, it will be seen that, as rod 160 is extended by spring 142 as the air pressure in chamber 155 drops below that specified for safe operation, the link 162 will be pivoted counterclockwise as seen in FIG. 5 to extend the trip end 140 of indicator rod 139. Due to the position of unit S' on bracket 21, the end 140 will now trip wand 56 of detection unit D as it passes thereby. It will also be noted that due to the greater distance traveled by the slot 166, more of rod 139 will be extended for the same amount of piston movement when compared with unit S.

The exposed link 162 and bracket 164 are enclosed by a cup-shaped cover member 171. Cover 171 is attached to housing 125 by welding or some other conventional means to hold same in position and the working cavity 172 defined by member 171 is of a size to permit full operation of link 162.

From the foregoing, the operation of the invention is initiated by connecting circuit C to the voltage source V, here shown as 24 volts DC, and by properly manipulating levers 59 of units D to position wands 56 in their upright detecting positions. When one of the tires T loses pressure, its associated sensing unit S or S' extends rod 39 or 139 to trip wand 56 of the associated detection unit D to illuminate the proper bulb on annunciator panel A. The operator can then stop the vehicle and check the appropriate wheel assembly for the deflated tire. By looking toward the back side of the indicated wheel assembly, the operator can tell which sensing unit S or S' is activated to determine which tire is deflated. The trip end 40 or 140 of rod 39 or 139 may be color coded to indicate activation by exposure of the colored area.

The Y-shaped valve stem 35 of each tire T allows air to be added or removed from the tire while the system is connected. Either of the O-rings 38 is sufficient to seal around piston 36 and so are O-rings 52. Therefore, if one of the O-rings 38 or 52 fails, the system will still remain operative. The same also applies for O-rings 138 or 152.

Since the sensing units S or S' are mounted on diametrically opposite sides of flange 20, the balance of the rotating parts of assembly W and tires T is maintained. For a single tired assembly W, and appropriate weight (not shown) may be used to balance the wheel assembly.

While specific embodiments of the invention have been disclosed herein it is to be understood that full use of modifications, equivalents, and substitutions may be made without departing from the scope of the invention.

We claim:

1. An alarm system for indicating a low-pressure condition of a tire including; a pressure sensing unit communicating with the pressure in the tire, said unit including a trip member responsive to said tire pressure for extension thereof when said tire pressure drops below a predetermined point and for retraction thereof when said pressure is above said point; and a detection unit operatively associated with said sensing unit, said detection unit including a switch and an activating member for selectively opening and closing said switch, said activating member selectively extendable into the path of said trip member when extended but out of the path of said trip member when retracted, said trip member causing said activating member to close said switch when said trip member is extended and contacts said activating member; and control means operatively connected to said switch, said control means including first light means caused to be illuminated when said switch is closed; and flashing means for supplying a pulsating voltage to said first light means when illuminated to cause same to flash; said pressure sensing unit including a housing defining a pressure chamber therein in communication with the air pressure of said tire; a piston slidably received in said chamber in sealing relation therewith a rod attached to said piston and slidably extending from said housing; the air pressure of said tire urging the piston in a direction to retract said rod into the housing; resilient means urging the piston in a direction to cause the rod to be extended from said housing; a lever pivotally supported on the end of said housing and having a short arm connected to said rod and a longer arm connected to said trip member, said trip member extending through a bore in said housing parallel with the piston rod, whereby the movement of said trip member will be substantially greater than that of said rod.

2. An alarm system as in claim 1 wherein the activating member of said detection unit includes a wand adapted to be engaged by said trip member when the tire pressure is below normal, said wand being so mounted that when so engaged it will be moved to switch-closing position and will remain in such position until manually resetting said wand to trip-engaging position.

3. An alarm system as in claim 2, wherein said control means further includes malfunction surveillance means operatively connected to said first light means and responsive to a malfunction of said first light means to visually indicate such malfunction.

4. An alarm system as in claim 3 wherein said malfunction surveillance means includes a second light means and a transistor operatively connected to said first light means and said second light means, said transistor being responsive to a malfunction of said first light means to cause said second light means to be illuminated.

* * * * *